United States Patent [19]

Wilson

[11] 3,745,945

[45] July 17, 1973

[54] GARDEN SEEDER

[76] Inventor: Joseph G. Wilson, 15 Weston Hill Road, Riverside, Conn. 06878

[22] Filed: June 23, 1971

[21] Appl. No.: 156,009

[52] U.S. Cl. .................... 111/96, 222/162, 222/149
[51] Int. Cl. ............................................. A01c 5/02
[58] Field of Search .............. 111/91–98, 7.2, 3, 4; 172/21; 222/162, 149

[56] References Cited
UNITED STATES PATENTS

| 70,747 | 11/1867 | Russell et al. | 111/96 |
| 1,258,551 | 3/1918 | Fleming | 111/7.2 |
| 2,747,528 | 5/1956 | Hunkins | 111/92 |
| 3,504,647 | 4/1970 | Krarup | 111/96 |

FOREIGN PATENTS OR APPLICATIONS

| 922,987 | 4/1963 | Great Britain | 111/96 |
| 540,268 | 10/1941 | Great Britain | 111/96 |
| 75,599 | 6/1929 | Sweden | 111/96 |
| 205,786 | 1/1971 | Germany | 111/96 |

Primary Examiner—Robert E. Pulfrey
Assistant Examiner—Stephen C. Pellegrino
Attorney—D. Verner Smythe et al.

[57] ABSTRACT

A manually operated seeder and gardening device has a storage hopper for seeds with a tubular member projecting downwardly from the hopper and a second tubular member slideable in the first tubular member. A conical end on the slideable tubular member has an opening therein to permit the passage of seed from the storage hopper through openings in the fixed member into the openings in the slideable tubular member and out of the conical end to be deposited in a hole in the earth made by pressing the conical end into the earth. The arrangements of parts and relative sizes is such as to meter the seed to be deposited. The slideable tubular member has a spiral slot through which passes a fixed transverse pin so that axial movement of the slideable tubular member causes its rotation. A soil backfilling device on the conical end of the second tubular member fills the hole into which a seed has been placed upon the rotation of the second tubular member when the hopper is lifted and the second tubular member is urged outwardly by a spring. One form of the invention also can serve as a weeder.

7 Claims, 11 Drawing Figures

United States Patent [19]
Wilson
[11] 3,745,945
[45] July 17, 1973
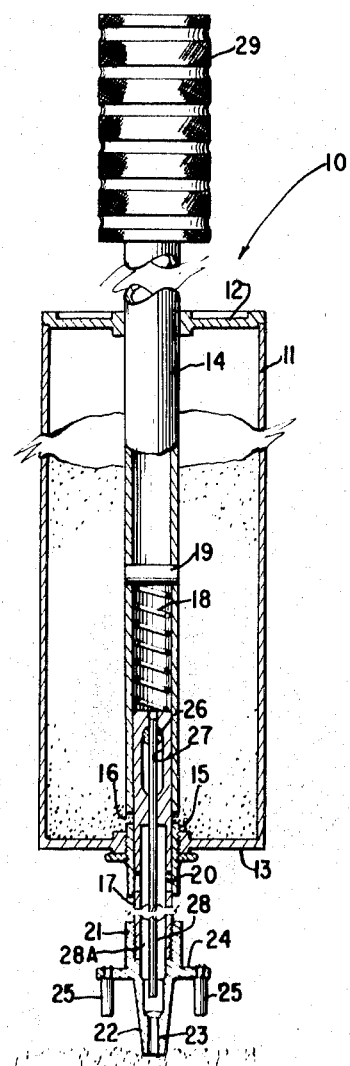

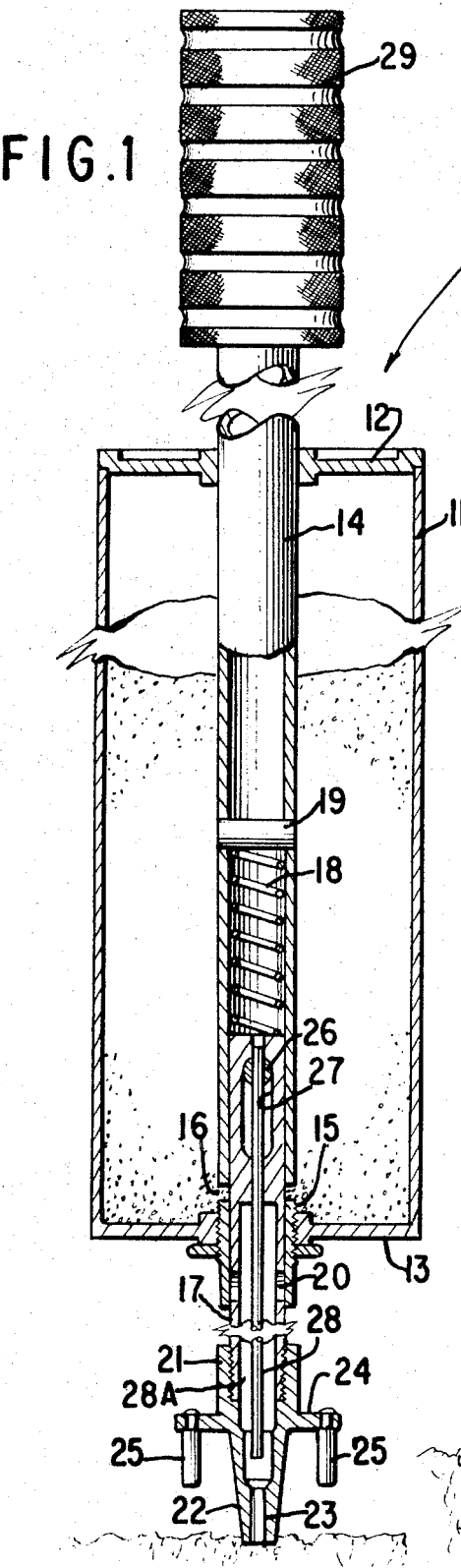
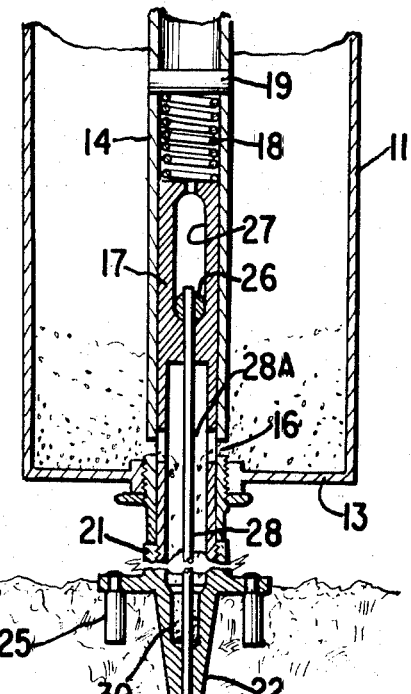
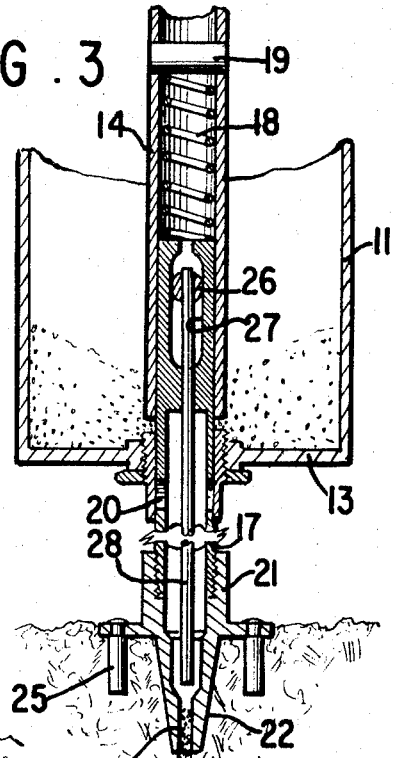
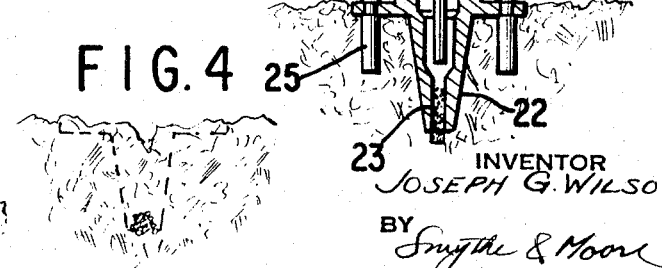
INVENTOR
JOSEPH G. WILSON
BY Smythe & Moore
ATTORNEYS

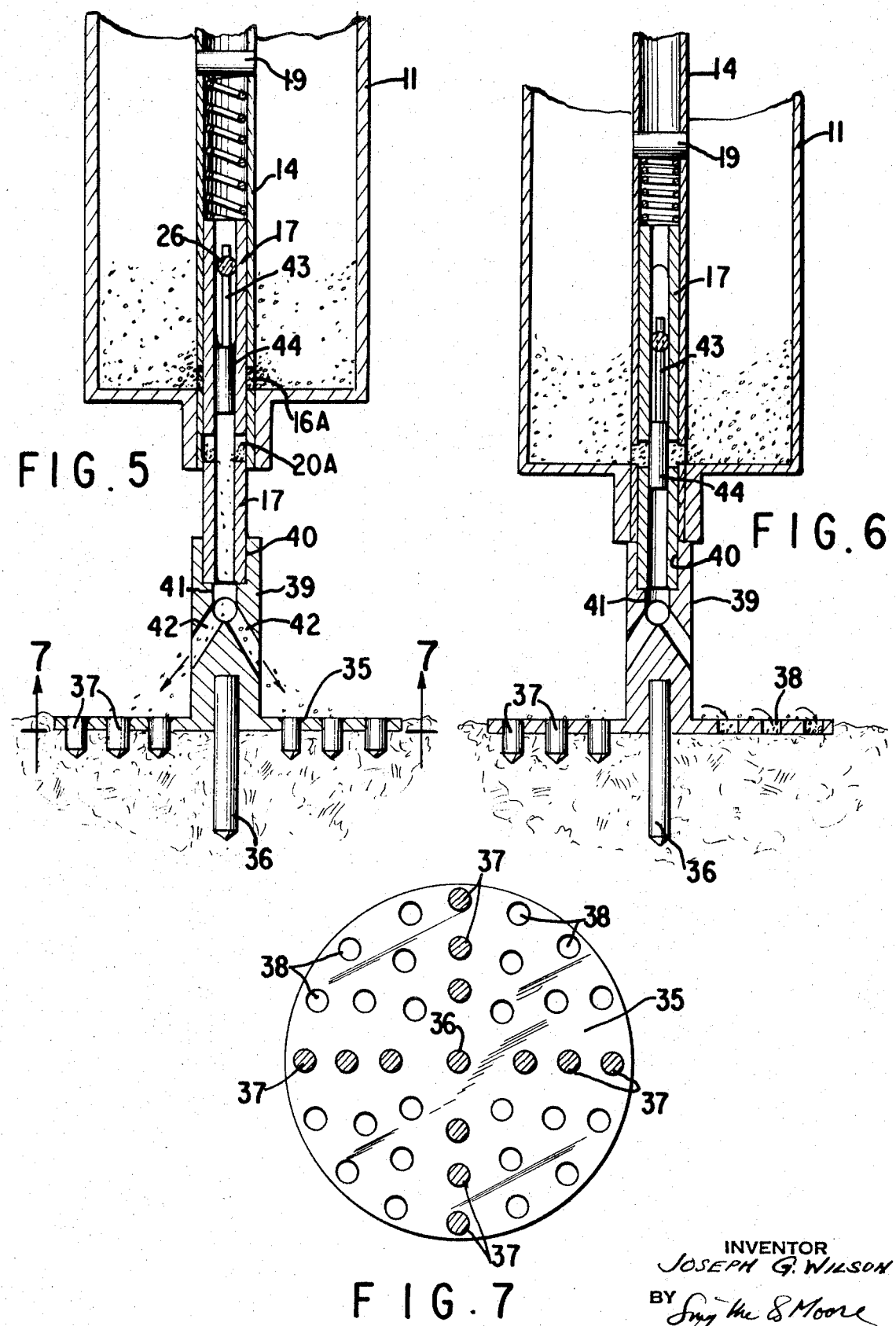

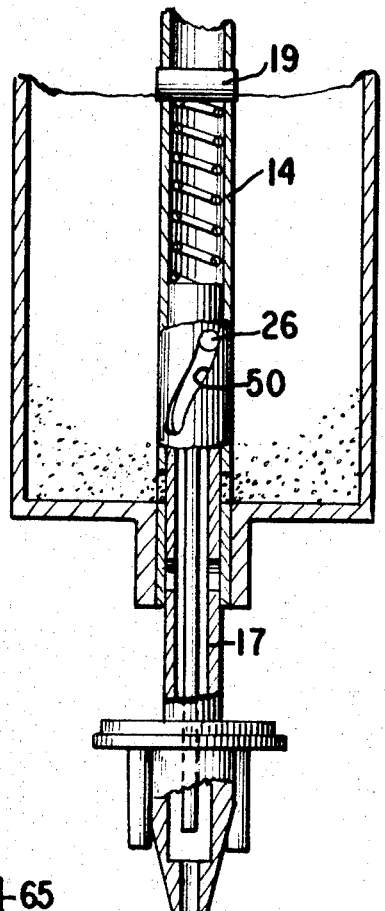
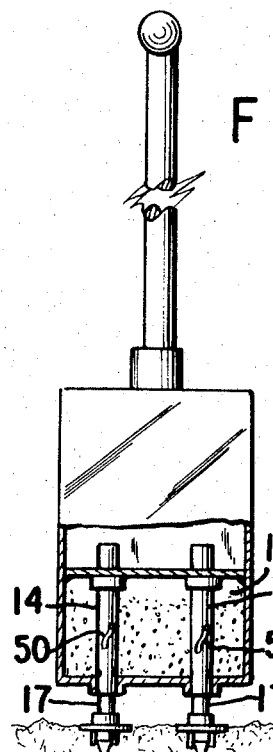
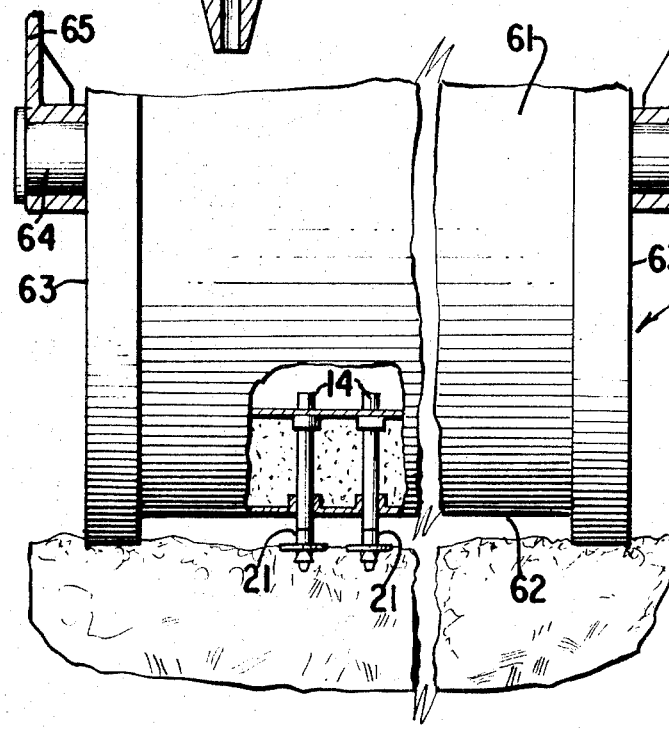
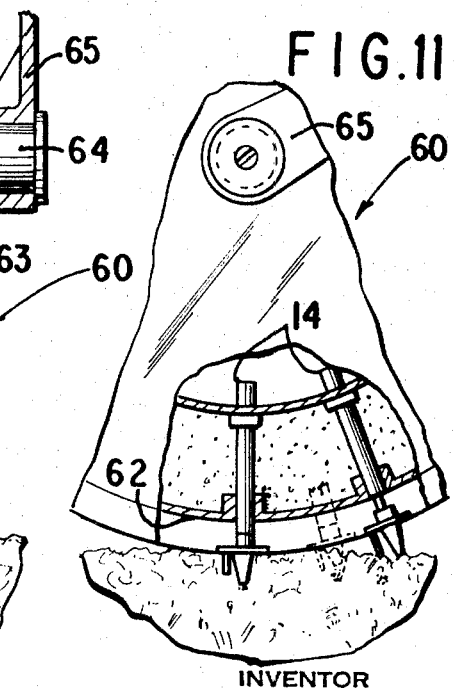
FIG.8
FIG.9
FIG.10
FIG.11
INVENTOR
JOSEPH G. WILSON
BY
Smythe & Moore
ATTORNEYS

GARDEN SEEDER

This invention relates to garden seeders for depositing seed in the ground and then refilling the hole.

One of the more laborious phases of gardening involves putting seeds into the ground. The seeding process essentially involves digging or forming a hole in the ground of the correct size and depth, placing a predetermined quantity of seeds in the hole, and then refilling of the hole. Various forms of manually operated seeder devices have been proposed which essentially form a hole in the ground and then place the seeds in the hole. However, such devices are generally not completely satisfactory since they do not properly backfill the soil into the hole after the seed has been placed therein. It is therefore necessary for the gardener to either manually fill each hole or to employ a second device for backfilling of the soil.

It has further been proposed to provide a manually operated seeder with some form of a backfilling structure. However, this structure is generally not satisfactory since it has required a separate operation on the part of the gardener or it has added unduly to the weight and complexity of the seeder device.

One of the objects of the present invention is to provide an improved garden seeder device.

Another of the objects of the present invention is to provide a manually operated seeder device which is light in weight, simple in construction and easy to operate.

Another of the objects of the invention is to provide a manually operated seeder device which automatically backfills the holes after the seeds have been deposited therein.

Another object of the invention is to provide a device which can also be used as a weeder.

According to one aspect of the present invention, a seeder device may comprise a storage hopper for seeds having a first tubular member mounted vertically within the hopper and opening at the lower end thereof. The tubular member is provided with an orifice which communicates with the lower portion of the hopper. A second tubular member is slideably mounted within the first tubular member and projects outwardly therefrom and is provided with a second opening which is registrable with the first opening. Spring means are provided within the first tubular member to bias the second tubular member outwardly thereof so that the openings in the respective tubular members are not aligned. The slideable tubular member is provided with an end which can be conical, which has a passage therethrough opening at the tip thereof. A rod is axially mounted within the first tubular member so as to prevent direct spilling of seed from the hopper into the conical end. An extension rod of smaller diameter is connected to the larger rod so as to be insertable into the conical end opening when the second tubular member is moved inwardly against the force of the spring means. Means can be provided in the device for rotating automatically the second tubular member when it slides axially within the first tubular member.

The rotating means may comprise a spiral slot in the second tubular member with a transverse pin fixedly positioned in the first tubular member and passing through the slot. The coaction between the slot and the pin will produce a rotation of the second tubular member as it moves axially.

Other objects, advantages and features of the invention will become apparent from the accompanying description and drawings, which are merely exemplary.

In the drawings:

FIG. 1 is a vertical longitudinal sectional view of one form of the garden seeder according to the present invention;

FIG. 2 is a view similar to that of FIG. 1 but showing only the lower portion of the seeder with the tubular member being in a position when the seeder has been pressed into the ground;

FIG. 3 is a view similar to that of FIG. 2 but showing the movement of the seed implanting components as the hopper is first moved upward from the ground;

FIG. 4 is a vertical sectional view of a hole in the ground after the seeds have been implanted therein and the soil backfilled in the hole;

FIG. 5 is a view similar to that of FIG. 3 showing a modified arrangement for the depositing of seeds on the surface of the ground.

FIG. 6 is a view similar to that of FIG. 5 and showing the modified seeder with its components in the position when the seeder is pressed into the ground;

FIG. 7 is a sectional view taken along the line 7—7 of FIG. 5;

FIG. 8 is a view similar to that of FIG. 2 but showing the slotted portion of the tubular member in elevation;

FIG. 9 is a view similar to that of FIG. 1 but in smaller scale of a modified seeder having a plurality of seed implanting conical ends;

FIG. 10 is a front elevational view of a further modification of the seeder wherein the storage hopper comprises a cylinder and the seed implanting devices are mounted on the periphery of the hopper; and FIG. 11 is a side elevational view of a portion of the seeder shown in FIG. 10 with a portion of the hopper being cut away to illustrate the seed implanting devices.

Proceeding next to the drawings wherein like reference symbols indicate the same parts throughout the various views, a specific embodiment of the present invention will be described in detail.

In one form of a garden seeder as seen in FIG. 1, the seeder is generally shown at hopper 11 which may be cylindrical in shape and may be formed of a transparent synthetic plastic material. The ends of the hopper are closed by an upper end plate 12 and a lower end plate 13. The upper end plate 12 may be in the form of a removable cover which permits filling of the hopper with seeds. The cover plate 12 may also be formed of a plastic material.

The hopper 11 is mounted upon a length of pipe or tubular member 14 by means of a screw thread 15 which permits adjustment of rod 14 with respect to bottom 13 of the hopper. There are orifices 16 in the pipe 14 which communicate with the lower portion of the hopper 11 to permit passage of seed from the hopper into pipe 14. The amount of seed to be dispensed per stroke of the seeder is adjusted by rotating hopper 11 on the threaded connection 15 of the bottom plate 13 so that plate 13 covers a portion of the orifice 16 which serves as a metering orifice for seeds. Raising hopper 11 with respect to pipe 14 will decrease the quantity of seed dispensed. Lowering hopper 11 on pipe 14 will increase the amount of seed until the metering orifices are completely open at which time the maximum quantity of seed is dispensed.

A second tubular member 17 is slideably received within the lower open end of pipe 14 and projects outwardly therefrom. This tubular member 17 functions as a plunger and is maintained in its outwardly projected position by means of a spring 18 (FIG. 1) which is positioned between one end of plunger 17 and a pin 19 secured in pipe 14.

In the form seen in FIG. 1 and 2, the interior of plunger 17 is hollow and the plunger is provided with orifices 20 which register with the orifice 16 when the plunger is in its retracted position as seen in FIG. 2.

The lower end of plunger 17 has threaded thereon a nozzle 21 having a tip 22 (which may be conical), through which extends passage 23 to permit the flow of seed from the interior of the plunger to a hole made in the ground. A backfill plate 24 is mounted on nozzle 21. The plate 24 has a plurality of downwardly extending pins 25 positioned adjacent its periphery. Backfill plate 24 and pins 25 move with nozzle 21 and plunger 17.

The stroke of plunger 17 is determined by means of a transversely extended pin 26 secured within pipe 14 and passing through an axial slot 27 in the plunger. An anti-plug rod 28 is attached to and extends downwardly through plunger 17 so as to be insertable in passage 23 in nozzle 21 to close or plug nozzle on the down stroke of the device which retracts the plunger. There is a chamber 28A between rod 28 and the inside of tube 14.

Backfill plate 24 is threadedly or otherwise mounted on nozzle 21 and its position can be adjusted on the nozzle by the operator to control the depth to the hole.

In operation, the operator thrusts the nozzle into the ground and continues to push downwardly on a handle 29 mounted on the outer end of pipe 14. A downward movement continues until the plunger 14 reaches its retracted position as shown in FIG. 2. In this position, the metering orifice means 16 is aligned with the opening means 20 in plunger 14 so that seed moves from the hopper into the plunger chamber 28A. The seed accumulates in the plunger chamber 28A and is discharged when the device is lifted and will flow out through the opening 23, because the opening is no longer blocked by rod 28. As the operator lifts handle 29 and pipe 14 and hopper herewith, spring 18 will keep the plunger in its bottom position. As rod 28 is withdrawn from passage 23, the seed will flow outwardly through the passage into the hole in the ground on the upward movement of the hopper and pipe. The amount of seed will depend upon the size of the orifices.

As the operator then lifts the seeder to withdraw the nozzle from the ground, the handle can be twisted to rotate backfill plate 24 and its pins 25 to cause soil to be pushed into the hole in the ground to cover the seed as seen in FIG. 4.

The agitation provided by movement of the seeder by the operator results in a fluidizing action to the seed in the seed hopper 11 and prevents plugging of metering orifice 16.

In the modified seeder illustrated in FIGS. 5 to 7 inclusive, the end of plunger 17 is provided with a circular support and distributing plate 35 having a downwardly depending center line pin 36 and a plurality of radially aligned scarifying pins 37 (FIG. 7). Between pins 37 there are provided openings 38 through which seed may be distributed when deposited thereon. Plate 35 is mounted on an axially extended hub 39 having a socket end 40 which receives the end of plunger 17 and may be threaded or otherwise mounted thereon. The interior of hub 39 is provided with an axial passage 41 extending from socket 40 to branching passages 42.

The seeder of FIGS. 5 to 7, inclusive, works in the same manner as described for FIGS. 1 to 4, inclusive, except that the seed, instead of being implanted in holes in the ground, passes downwardly through passage 41 in the hub 39 and is distributed through branch passages 42 onto the plate 39 and then downwardly through openings 38. The seeder can first be turned before it is pushed downwardly so as to scarify the soil to receive seed.

Instead of anti-plug rod 28, as in the embodiment of FIGS. 1 to 3, inclusive, the modification of FIGS. 5 to 7, inclusive, is provided with a rod 43 attached to transverse pin 26. A non-spill plug 44 is fixed on the end of rod 43 and is positioned to block the aligned orifices 16 and 20 when the seeder is in the position as illustrated in FIG. 6. The seed will be measured by the amount fed into orifices 20A through orifice means 16A. It also is possible to remove rod 43 and plug 44 and depend upon the orifice sizes to meter the seed.

In the seeder of FIG. 8, the upper end of plunger 17 is provided with a spiral slot or cam 50 within which is received pin 26. The coaction between spiral slot 50 and pin 26 will cause the plunger 17 to rotate through an angle when the plunger moves axially with respect to pipe 14. With this structure, it is not necessary for the operator to twist the seeder manually when it is being lifted. When the operator lifts the seeder at the end of the down stroke, plunger 17 will rotate and will cause the backfill plate and its pins to loosen the surrounding soil and backfill the soil over the hole into which the seeds have been planted. A similar arrangement (not shown) also could be applied to the forms of FIGS. 1 to 7, inclusive.

In the seeder illustrated in FIG. 9, hopper 11 is provided with two pipes 14 and associated plungers 17 (FIG. 8). This seeder works in the same manner as previously described except that the operator is now able to plant two holes with each stroke of the seeder. While only two seeding nozzles have been illustrated, it is apparent that any number of such nozzles may be mounted on a seeder device.

In FIGS. 10 and 11, there is illustrated a seeder illustrated generally at 60 which comprises a cylindrical hopper or drum 61 with the longitudinal axis parallel to the ground so that the peripheral surface 62 rolls adjacent the ground in the manner as shown in FIGS. 10 and 11. The ends of cylindrical hopper 61 may be provided with flanges or cover members 63 whose diameter is greater than that of the hopper so that these end plates function as wheels in FIG. 10 to space the cylindrical surface 62 above the ground. The entire cylindrical hopper 61 may be mounted upon an axle of shaft 64 secured by appropriate framework 65 to a seeding apparatus. The seeding apparatus may be the type which is pulled over the ground by means of a tractor or some other vehicle.

In a similar manner, the cylindrical hopper is provided with a plurality of pipes 14 and plungers 17 whose structure is such as described above. Thus, as the cylindrical hopper rolls over the ground, successive nozzles will be thrust into the ground and the resulting movement of the hopper over the ground will bring about the up and down strokes of the plunger as described above.

It can be seen that the present invention discloses a simple yet reliable seeding device which can be manually operated or used in combination with a common actuator, such as a drum, which is caused to be moved over the ground to be seeded. Without any further effort on the part of the operator, the seeder, according to the present invention, will backfill the soil over the hole in the ground after the seed has been emplanted therein.

It is to be understood that changes in various details of construction and arrangement of parts may be made without departing from the spirit of the invention except as defined in the appended claims.

What is claimed is:

1. In a seeder device or the like, the combination of a storage hopper for seeds, a first tubular member mounted vertically within said hopper and opening at the lower end thereof, said first tubular member having opening means therein communicating with the lower portion of said hopper, a second tubular member slideably received within said first tubular member and projecting outwardly thereof, there being second opening means in said second tubular member registrable with said first opening means, spring means within said first tubular member biasing said second tubular member outwardly thereof so that said opening means are not aligned, an end member on said second tubular member and having an outwardly extending opening adjacent the tip thereof, and rod means axially mounted within said first tubular member and inserted into the end member opening when said second tubular member is moved inwardly against the force of said spring means, said rod means blocking said passage when in said opening.

2. In a seeder device as claimed in claim 1 and comprising means on said end member for backfilling soil.

3. In a seeder device as claimed in claim 1 and including means on said end member for backfilling soil upon rotation of said second tubular member.

4. In a seeder device as claimed in claim 2 including backfilling means comprising a plate on said end member spaced inwardly therefrom, and a plurality of downwardly projecting pins on said plate adjacent the periphery thereof.

5. In a seeder device as claimed in claim 1 and comprising a transverse pin through said first tubular member, there being an axial slot in said second tubular member with said pin passing through said slot to limit the axial movement of said second tubular member.

6. In a seeder device as claimed in claim 5 wherein said slot is spiral-shaped whereby the coaction of said slot and pin rotates said second tubular member when it slides axially within said first tubular member.

7. In a seeder device or the like, the combination of a storage hopper for seeds, a first tubular member mounted vertically within said hopper and opening at the lower end thereof, said first tubular member having opening means therein communicating with the lower portion of said hopper, a second tubular member slideably received within said first tubular member and projecting outwardly thereof, there being second opening means in said second tubular member registrable with said first opening means, spring means within said first tubular member biasing said second tubular member outwardly thereof so that said opening means are not aligned, an end member on said second tubular member and having a passage therethrough opening outwardly thereof, rod means axially mounted within said first tubular member and inserted into the end member opening when said second tubular member is moved inwardly against the force of said spring means, and means between said tubular members for rotating said second tubular member when it slides axially within said first tubular member.

* * * * *

UNITED STATES PATENT OFFICE
CERTIFICATE OF CORRECTION

Patent No. 3,745,945                    Dated July 17, 1973

Inventor(s) Joseph G. Wilson

It is certified that error appears in the above-identified patent and that said Letters Patent are hereby corrected as shown below:

Column 6, line 2, "2" should be --7--.

Signed and sealed this 12th day of February 1974.

(SEAL)
Attest:

EDWARD M. FLETCHER, JR.          C. MARSHALL DANN
Attesting Officer                Commissioner of Patents